United States Patent
Srinivasan et al.

(10) Patent No.: US 9,417,092 B2
(45) Date of Patent: Aug. 16, 2016

(54) AUTOMATIC FIXTURE MONITORING USING MOBILE LOCATION AND SENSOR DATA WITH SMART METER DATA

(71) Applicant: Samsung Electronics Co., Ltd., Suwon-si, Gyeonggi-do (KR)

(72) Inventors: Vijay Srinivasan, San Jose, CA (US); Emmanuel M. Tapia, Newark, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 58 days.

(21) Appl. No.: 14/262,601

(22) Filed: Apr. 25, 2014

(65) Prior Publication Data

US 2015/0308856 A1 Oct. 29, 2015

(51) Int. Cl.
*G08B 23/00* (2006.01)
*G01D 4/00* (2006.01)
*H04L 29/08* (2006.01)

(52) U.S. Cl.
CPC ............... *G01D 4/002* (2013.01); *H04L 67/12* (2013.01); *H04L 67/125* (2013.01); *Y02B 70/343* (2013.01);
(Continued)

(58) Field of Classification Search
CPC ...... G01D 4/002; H04L 67/12; H04L 67/125; Y04S 20/32; Y04S 20/34; Y04S 20/38; Y04S 20/40
USPC ........................................................ 340/870
See application file for complete search history.

(56) References Cited

U.S. PATENT DOCUMENTS

| | | | |
|---|---|---|---|
| 8,447,541 B2 | 5/2013 | Rada et al. | |
| 2008/0082275 A1* | 4/2008 | Caggiano | G01R 15/146 702/61 |

(Continued)

FOREIGN PATENT DOCUMENTS

| | | |
|---|---|---|
| WO | 2011091444 A1 | 7/2011 |
| WO | 2011156374 A2 | 12/2011 |
| WO | 2013079726 A1 | 6/2013 |

OTHER PUBLICATIONS

Baranski, M. et al., "Genetic Algorithm for Pattern Detection in NIALM Systems", Proceedings of the 2004 IEEE International Conference on Systems, Man and Cybernetics, 2004, pp. 3462-3468, IEEE, United States.

(Continued)

*Primary Examiner* — Hai Phan
*Assistant Examiner* — Zhen Y Wu
(74) *Attorney, Agent, or Firm* — Sherman IP LLP; Kenneth L. Sherman; Steven Laut

(57) ABSTRACT

A method and system for monitoring resource information and user activity. The method includes acquiring one or more data streams from one or more resource meters and one or more electronic device sensors. Discrete events are computed from each data stream. A sequence of discrete sensor-meter event itemsets are extracted based on the events. Frequent sensor-meter event itemsets are discovered from the sequence of discrete event itemsets that occur together, and a frequency of occurrence of each frequent co-occurrence itemset is discovered. Rising sensor-meter event itemsets and falling sensor-meter event itemsets are matched based on appliance state models and the frequency of occurrence of each sensor-meter event itemset. Each individual fixture is identified. Each fixture cluster is classified to a fixture category. Based on the matched fixture events, fixture clusters, and categories, resource usage information and user activities are determined for each fixture usage event identified.

30 Claims, 10 Drawing Sheets

(52) U.S. Cl.
CPC .............. *Y02B 90/241* (2013.01); *Y02B 90/245* (2013.01); *Y04S 20/32* (2013.01); *Y04S 20/34* (2013.01); *Y04S 20/38* (2013.01); *Y04S 20/40* (2013.01)

(56) References Cited

U.S. PATENT DOCUMENTS

| | | | |
|---|---|---|---|
| 2008/0249969 A1* | 10/2008 | Tsui | H02J 7/0055 706/46 |
| 2010/0039263 A1 | 2/2010 | Chen et al. | |
| 2011/0046805 A1 | 2/2011 | Bedros et al. | |
| 2011/0063126 A1 | 3/2011 | Kennedy et al. | |
| 2011/0082599 A1 | 4/2011 | Shinde et al. | |
| 2011/0251807 A1* | 10/2011 | Rada | G01D 4/00 702/61 |
| 2012/0245752 A1* | 9/2012 | Borrett | G06Q 10/06 700/295 |
| 2013/0173081 A1* | 7/2013 | Sakamoto | G06F 1/26 700/297 |
| 2013/0215933 A1 | 8/2013 | Young et al. | |
| 2013/0289788 A1* | 10/2013 | Gupta | G05B 13/02 700/291 |
| 2014/0159914 A1* | 6/2014 | Heller | H04Q 9/00 340/870.02 |
| 2014/0214464 A1* | 7/2014 | Willis | G06F 17/30 705/7.12 |
| 2014/0277814 A1* | 9/2014 | Hall | H02J 3/14 700/298 |
| 2015/0057808 A1* | 2/2015 | Cook | G05B 13/04 700/275 |
| 2015/0088442 A1* | 3/2015 | Farrar | G01R 21/1333 702/62 |
| 2015/0156567 A1* | 6/2015 | Oliver | G08B 21/182 340/870.07 |

OTHER PUBLICATIONS

Gupta, S. et al., "ElectriSense: Single-Point Sensing Using EMI for Electrical Event Detection and Classification in the Home", Proceedings of the 12th ACM International Conference on Ubiquitous Computing (UbiComp'10), Sep. 26-29, 2010, pp. 139-148, ACM, United States.

Hart, G.W., "Nonintrusive Appliance Load Monitoring", Proceedings of the IEEE, Dec. 1992, pp. 1870-1891, vol. 80, No. 12, IEEE, United States.

Lu, H. et al., "SoundSense: Scalable Sound Sensing for People-Centric Applications on Mobile Phones", Proceedings of the 7th International Conference on Mobile Systems, Applications, and Services (MobiSys '09), Jun. 22-25, 2009, pp. 165-178, ACM, United States.

Froehlich, J. et al., "HydroSense: Infrastructure-Mediated Single-Point Sensing of Whole-Home Water Activity", Proceedings of the 11th International Conference on Ubiquitous Computing (UbiComp '09), Sep. 30-Oct. 3, 2009, pp. 234-244, ACM, United States.

Srinivasan, V. et al., "FixtureFinder: Discovering the Existence of Electrical and water Fixtures", Proceedings of the 12th International Conference on Information Processing in Sensor Networks (IPSN '13), Apr. 8-11, 2013., pp. 115-128, ACM, United States.

Kim, Y. et al., "ViridiScope: Design and Implementation of a Fine Grained Power Monitoring System for Homes", Proceedings of the 11th International Conference on Ubiquitous Computing (UbiComp '09), Sep. 30-Oct. 3, 2009, pp. 245-254, ACM, United States.

Barve, A. et al., "Android based Remote Monitoring System", Proceedings of the International Conference in Recent Trends in Information Technology and Computer Science (ICRTITCS' 12), International Journal of Computer Applications, 2012, pp. 1-3, United States.

Uddin, M.A. et al., "EnergySniffer: Home Energy Monitoring System using Smart Phones", Proceedings of the 8th International Wireless Communications and Mobile Computing Conference (IWCMC'12), Aug. 27-31, 2012, pp. 159-164, IEEE, United States.

* cited by examiner

US 9,417,092 B2

AUTOMATIC FIXTURE MONITORING USING MOBILE LOCATION AND SENSOR DATA WITH SMART METER DATA

TECHNICAL FIELD

One or more embodiments generally relate to monitoring fine-grained resource usage and user activities in a location and, in particular, to monitoring fixture resource usage and user activities in homes by fusing data from smart meters with indoor location and sensor data from mobile devices.

BACKGROUND

For numerous applications in home energy and home health, users in homes typically purchase devices to assist in monitoring resource usage for tracking cost based on usage, and for assisting in reducing energy consumption.

SUMMARY

One or more embodiments generally relate to monitoring resource, fixture and appliance usage as well as user activities in locations, such as homes, dwellings, etc. In one embodiment, a method provides for acquiring one or more data streams from one or more resource meters and one or more electronic device sensors. Discrete events are computed from each data stream. A sequence of discrete sensor-meter event itemsets are extracted based on the events. Frequent sensor-meter event itemsets are discovered from the sequence of discrete event itemsets that occur together, and a frequency of occurrence of each frequent co-occurrence itemset is discovered. Rising sensor-meter event itemsets and falling sensor-meter event itemsets are matched based on appliance state models and the frequency of occurrence of each sensor-meter event itemset. Each individual fixture is identified based on clustering the matched sensor-meter event itemsets using sensor-meter event features. Each fixture cluster is classified to a fixture category using a multi-modal fixture model trained on sensor and meter event features. Based on the matched fixture events, fixture clusters, and categories, resource usage information and user activities are determined for each fixture usage event identified.

In one embodiment, a system is provided that includes one or more resource meters that each track resource usage data for a location. An electronic device includes a plurality of sensor devices. In one embodiment, the electronic device acquires one or more data streams from one or more resource meters and one or more electronic sensors, computes discrete events from each data stream, extracts a sequence of discrete sensor-meter event itemsets based on the events that occur together, discovers the frequent sensor-meter event itemsets that occur together, and computes a frequency of occurrence for each sensor-meter event itemset, matches rising and falling sensor-meter event itemsets based on appliance state models and the frequency of occurrence of each sensor-meter event itemset, identifies each individual fixture based on clustering the matched sensor-meter event itemsets using sensor-meter event features, classifies each fixture cluster to a fixture category using a multi-modal fixture model trained on sensor and meter event features, and based on the matched fixture events, fixture clusters, and categories, determines resource usage information and associated user activities for each fixture usage event identified.

In one embodiment a non-transitory computer-readable medium having instructions which when executed on a computer perform a method comprising: acquiring one or more data streams from one or more resource meters and one or more electronic sensors. In one embodiment, discrete events are computed from each data stream. In one embodiment, a sequence of discrete sensor-meter event itemsets are extracted based on the events that occur together. In one embodiment, the frequent sensor-meter event itemsets that occur together are discovered, and a frequency of occurrence for each sensor-meter event itemset is determined. In one embodiment, rising and falling sensor-meter event itemsets are matched based on appliance state models and the frequency of occurrence of each sensor-meter event itemset. In one embodiment, each individual fixture is identified based on clustering the matched sensor-meter event itemsets using sensor-meter event features. In one embodiment, each fixture cluster is classified to a fixture category using a multi-modal fixture model trained on sensor and meter event features. In one embodiment, based on the matched fixture events, fixture clusters, and categories, resource usage information and associated user activities are determined for each fixture usage event identified.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
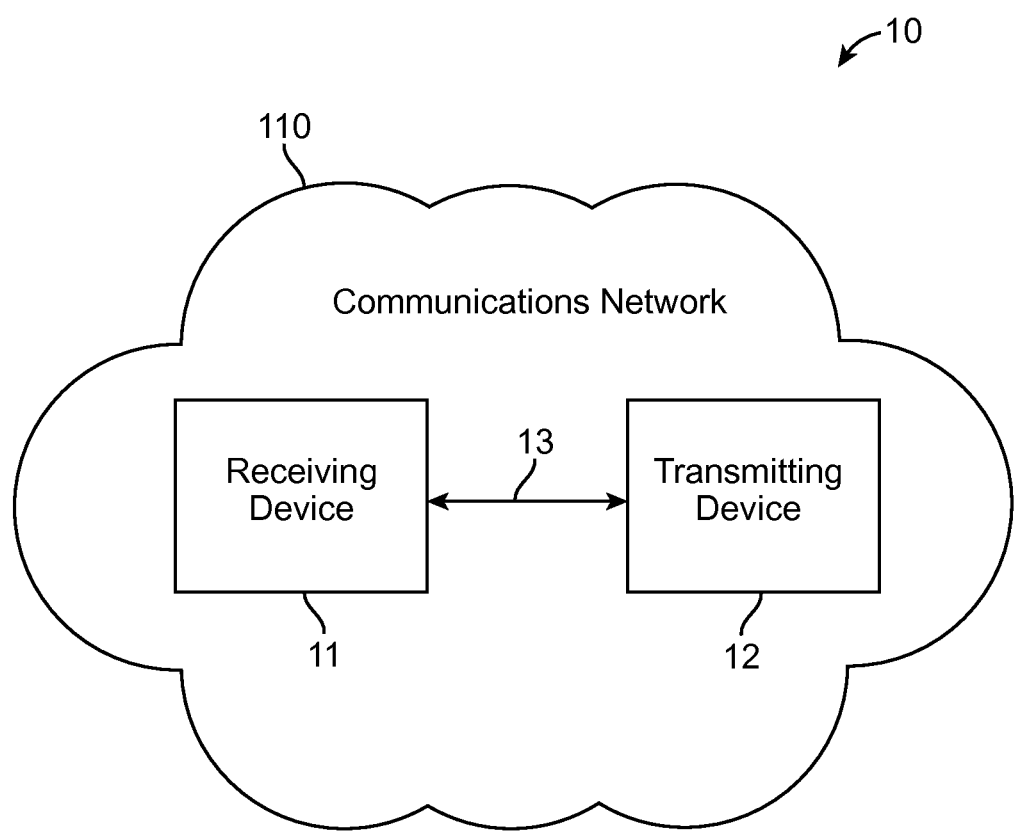
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments relate to monitoring fixture and appliance usage and resource consumption information as well as user activities related to fixture and appliance usage in locations, such as homes, dwellings, etc. In one embodiment, a method provides for monitoring fixture and appliance usage and the associated resource consumption in homes, along with user activities based on the appliance usage. In one embodiment, the method includes acquiring one or more data streams from one or more resource meters and one or more electronic device sensors. Discrete events are computed from each data stream. A sequence of discrete sensor-meter event itemsets are extracted based on the events. Frequent sensor-meter event itemsets are discovered from the sequence of discrete event itemsets that occur together, and a frequency of occurrence of each frequent co-occurrence itemset is discovered. Rising sensor-meter event itemsets and falling sensor-meter event itemsets are matched based on appliance state models and the frequency of occurrence of each sensor-meter event itemset. Each individual fixture is identified based on clustering the matched sensor-meter event itemsets using sensor-meter event features. Each fixture cluster is classified to a fixture category using a multi-modal fixture model trained on sensor and meter event features. Based on the matched fixture events, fixture clusters, and categories, resource usage information and user activities are determined for each fixture usage event identified.

One or more embodiments provide automatic monitoring of: individual electrical and water fixtures that are used in the home, the amount of resources (energy or water) used by fixtures, and the daily activities of one or more users based on fixture usage, such as cooking, toileting, and showering, etc. In one or more embodiments, estimates for the following are provided in a completely unsupervised, automatic approach that does not require any user effort: (a) what electrical, water, or gas fixtures or appliances are present in the home; (b) where the fixtures are located on the home floor plan; (c) when each individual fixture is being used; (d) how much energy or water or other resource each fixture consumes; (e) which user in a multi-resident home used the fixtures; (f) how much energy or water is wasted by each user; and (g) what daily activities such as cooking or showering, are performed by each user using the fixtures, and in which area of the home floor plan they are performed.

One or more embodiments combines indoor user location and sensor data from mobile devices (such as smartphones, smart watches, pendants, other wearable devices, tablets, mobile computing devices, etc.) with a single whole-house or whole-building or whole-floor smart water and power meter to infer: individual fixture usage, user activity, resource consumption per fixture per user, and user resource wastage, the location of each fixture or user activity, and visualize all the above inferences on the home floor plan.

One or more embodiments are able to disambiguate and identify when individual fixtures are being used based on both smart meter data and multi-modal mobile device sensor and indoor location data. In one embodiment, the input data sources may comprise: single smart water meter to measure whole-house water flow, smart power meter to measure whole-house power consumption, indoor location determination using a mobile electronic device, smartphone, watch, pendant and other wearable device sensor data, such as microphone sensor, temperature sensor, orientation from accelerometer, gyro, and compass, barometer, etc.

One or more embodiments combine mobile electronic device location and sensor data with smart meter data to automatically infer the location of fixtures, their usage times, and resource consumption values. One or more embodiments do not require extensive sensor deployment, manual training, and are able to display the fixture usage, resource consumption, wastage, and user activities using fixtures directly on the home's floor plan.

One or more embodiments do not require any additional home sensors. One embodiment leverages existing sensors from mobile electronic devices and the single whole-house smart water and power meter per home already installed by utility companies in homes or other locations. In one embodiment, the monitoring is unsupervised and: does not require manual labeling of fixture category and fixture location; does not require manual training data for each fixture; differentiates between similar, multiple fixtures with the same mobile electronic device sensor signature (due to combining the mobile electronic device sensor signature with indoor location from mobile electronic device and smart meter data, which helps disambiguate similar fixtures); differentiates between similar, multiple fixtures with the same smart meter load signature or infrastructure sensor signature (due to combining smart meter data, mobile electronic device sensor data, and indoor location to disambiguate fixtures with similar smart meter signatures); scales to handle multiple sensor streams easily since frequent pattern mining is used; scales to multi-state appliances (as opposed to just two state on-off fixtures) since frequency-weighted state machine matching is used; scales to classify large number of fixture categories since externally learned fixture usage models are used for fixture identification; and automatically identifies users for individual appliance usage instances.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include a mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences). In one embodiment, the communication operation of our system may include transmitting device sensor data and location information to a cloud or local server for inferring the resource and activity usage information. The communication operation may also include receiving smart meter data from smart meters in the same home or location using one of the available communication protocols, in order to perform resource usage and activity inferences.

Figure 2:
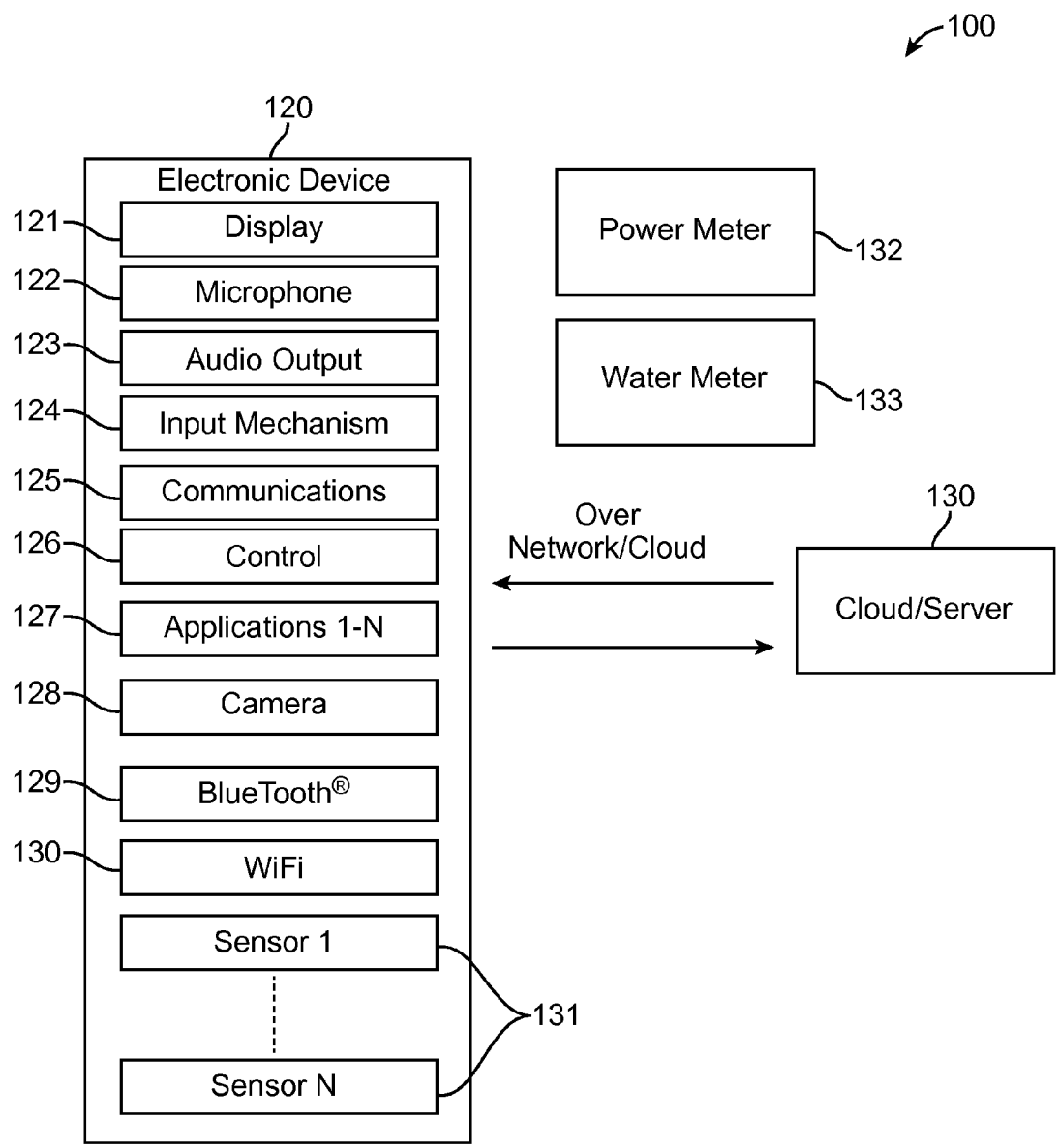
FIG. 2 shows a block diagram of architecture for a system including a mobile device including multiple sensors, according to an embodiment.

FIG. 2 shows a functional block diagram of an architecture system 100 that may be used for resource and activity monitoring using an electronic device 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, Applications 1-N 127, a camera module 128, a BlueTooth® module 129, a Wi-Fi module 130 and sensors 1 to N 131 such as the light, temperature, orientation, accelerometer sensors (N being a positive integer) and any other suitable components. In one embodiment, applications 1-N 127 are provided and may be obtained from a cloud or server 130, a communications network 110, etc., where N is a positive integer equal to or greater than 1. In one embodiment, the system 100 includes one or more resource meters, such as a smart power meter 132 and a smart water meter 133.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections or information about resource usage and user activity inferred by one or more embodiments) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In one embodiment, the processing for the data fusion and inference of resource usage and activity information may be performed on the device using the processors available on the device; in other embodiments, the device sensor and location data, along with smart meter data, may be transmitted to the cloud where the processing and inference of resource usage and activities may take place. In some embodiments, memory may be operative to store information related to other devices with which the electronics device 120 performs communications operations (e.g., saving contact information related to communications operations or storing information related to different media types and media items selected by the user). In one embodiment, the memory may store frequent co-occurrence patterns for meter-sensor events, appliance usage models, and long term resource usage, wastage, and activity information of residents in the home.

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include a resource usage, resource information processing (e.g., appliance usage, fixture usage, etc.) and user activity application, location application (e.g., mobile electronic device location determination application), an automatic speech recognition (ASR) application, a dialog application, a map application, a media application (e.g., QuickTime, MobileMusic.app, or MobileVideo.app), social networking applications (e.g., Facebook®, Twitter®, Etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the BlueTooth® module 129 comprises processes and/or programs for processing BlueTooth® information, and may include a receiver, transmitter, transceiver, etc.

In one embodiment, the electronics device 120 may include multiple sensors 1 to N 131, such as accelerometer, gyroscope, microphone, temperature, light, barometer, magnetometer, compass, radio frequency (RF) identification sensor, etc.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
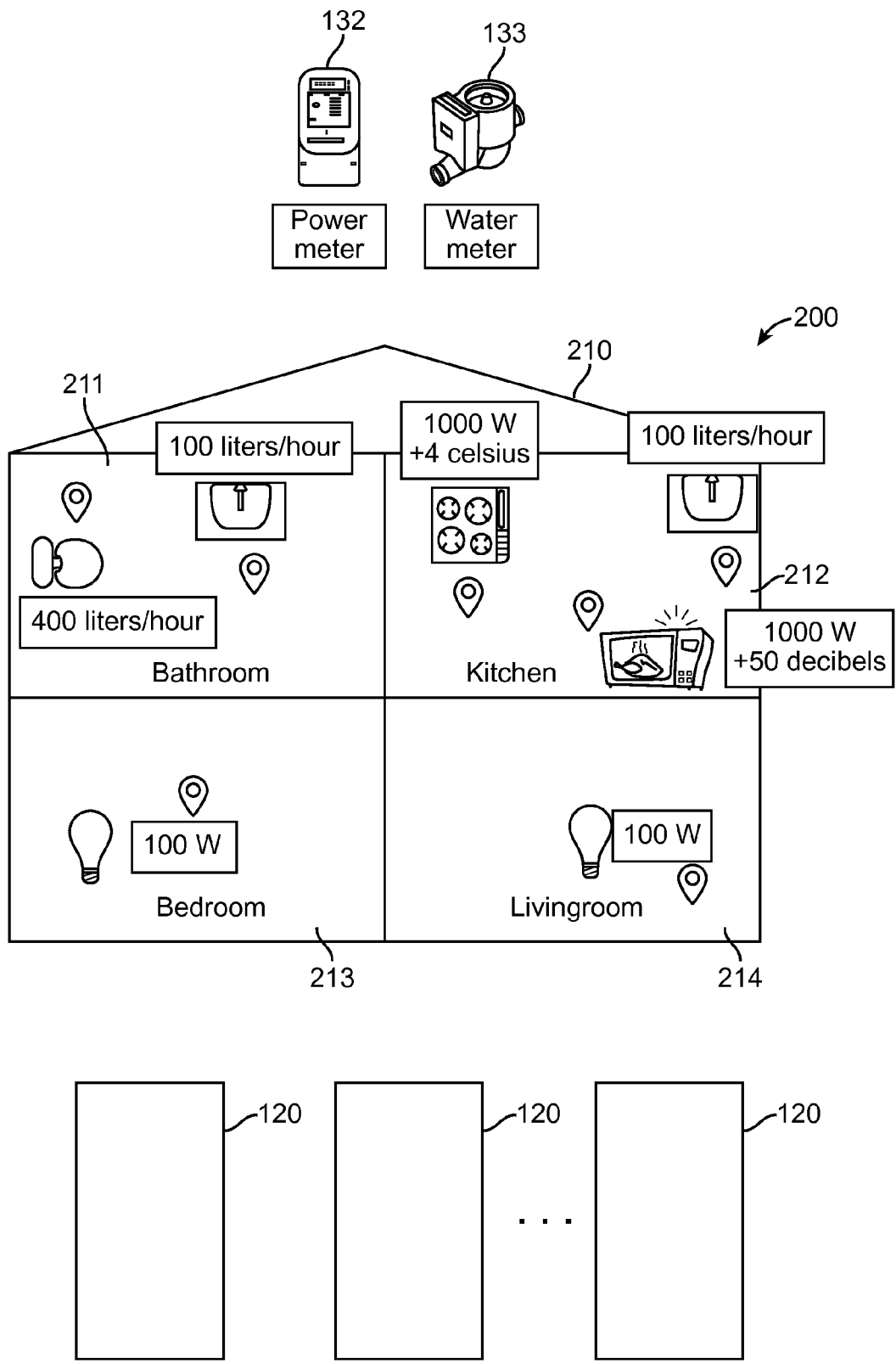
FIG. 3 shows an example system, according to an embodiment.

FIG. 3 shows an example system 200, according to an embodiment. In one embodiment, the system 200 includes one or more mobile electronic devices 120 where the devices are carried by residents in the home or location, a smart power meter 132, a smart water meter 133, and a location 210 (e.g., a home, apartment, condominium, townhouse, duplex, etc., building, store, etc.) that includes one or more various fixtures (e.g., bathrooms with a sink(s), shower, bathtub, etc., kitchen with sink, any other sink, etc.), and various appliances (e.g., electronic appliances, consumer electronics (CE) devices, lights, microwave ovens, toaster ovens, air conditioners, heaters, washing machines, dryers, ranges, ovens, etc.).

In one example embodiment, as shown in the location or home 210, multiple rooms, such as bathroom 211, kitchen 212, bedroom 213 and living room 214 are present. In one embodiment, the home or location 210 includes data sources such as indoor location and sensor data from electronic device 120, smart power meter data from power meter 132, and smart water meter data from water meter 133 along with a monitoring software application to fuse and infer the resource usage and activities (e.g., a mobile fixture monitoring application 127 running on the device, or a separate application running on a local server or in the cloud 130). In one example embodiment, the flush fixture in the bathroom 211 is identified by its unique flow rate (e.g., 400 liters per hour) from the smart water meter 133 and its location in the bathroom 211. The kitchen 212 and bathroom 211 sinks are identified based on their water flow rates (e.g., 100 liters per hour) and differentiated based on their location. In one example embodiment, the light fixtures in the living room 214 and the bedroom 213 are identified based on their low ON-OFF state power consumption of 100 W from the smart power meter 132 and differentiated based on the electronic device 120 location. In one example embodiment, the kitchen 212 microwave and stove have similar locations and power consumptions (e.g., 1000 W), but are differentiated based on their effect on the microphone 122 of an electronic device 120 (+50 decibels) and temperature (e.g., +4 Celsius) sensor 131 readings, respectively.

In one embodiment, a mobile fixture monitoring application 127 executing on an electronic device 120 combines three main data sources inside a home or location: smart meters (such as the single whole-house smart water meter 133 and power meter 132 per home installed by utility companies), electronic device 120 based indoor location co-ordinates, and electronic device 120 sensors 1-N 131 to infer the following outputs: (a) home/location presence of electrical appliances and water fixtures; (b) location of fixtures on home/location floor plan; (c) use time of each individual fixture/appliance; (d) energy, water, or other resource consumption of each individual appliance/fixture; (e) the user that used the appliance/fixture; (f) energy, water or other resource wasted by that user; and (g) related daily activities of the user in view of the appliance usage and activity area.

In one embodiment, the mobile fixture monitoring application 127 executing on an electronic device 120 performs the following: acquires data streams from smart meters (e.g., power meter 132, water meter 133) and electronic device 120 sensors 1-N 131; computes events from each data stream, discretizes the events and extracts a sequence of discrete sensor-meter event itemsets that occur together; discovers the frequent sensor-meter event itemsets from the sequence of discrete event itemsets that occur together, along with the frequency of occurrence of each frequent co-occurrence itemset; uses pre-stored appliance state machine models and the frequencies of sensor-meter event itemsets to match ON sensor-meter event itemsets and OFF sensor-meter event itemsets to a single appliance; identifies each individual fixture by first clustering the matched sensor-meter events to a set of unique fixtures, and classifies each cluster to a fixture category based on a pre-stored multi-modal fixture model based on sensor-meter event features; finally outputting information used to compute all the outputs (a) to (g) listed above. In one example embodiment, to compute (g), a pre-stored activity classifier that is trained on fixture usage data from a set of training homes/locations is used. In one example embodiment, to compute (b), the median location for all location events from a given fixture cluster is used.

In one embodiment, the data stream sources for the mobile fixture monitoring application 127 executing on an electronic device 120 may include the following: (i) single whole-house or location smart water meter 133 and power meter 132 per home/location already installed by utility companies in homes; (ii) electronic device 120 indoor location co-ordinates computed by combining the home/location floor plan, electronic device 120 sensors 1-N 131 (e.g., an accelerometer, a gyroscope and compass), and electronic device 120 radio signal strengths from Bluetooth® and Wi-Fi signals; and (iii) electronic device 120 sensors 1-N 131 (e.g., microphone 122, temperature sensor, light sensor, barometer sensor, magnetometer sensor, and compass sensor).

In one embodiment, the information obtained by the mobile fixture monitoring application 127 may be used by other end user applications, such as resource usage estimation and visualization, activity recognition, effective bill sharing, or resource wastage notification. In one embodiment, the mobile fixture monitoring application 127 may require a user to carry their electronic device 120 at all times for activity tracking. However, this might be lower overhead for the user than purchasing and installing several sensors in the home/ location. In one example embodiment, if a user desires to perform an energy audit of the home/location, they may carry the electronic device 120 in the home/location for a time period (e.g., a week) to obtain an understanding on the resource usage of fixtures in the home/location.

Figure 4:
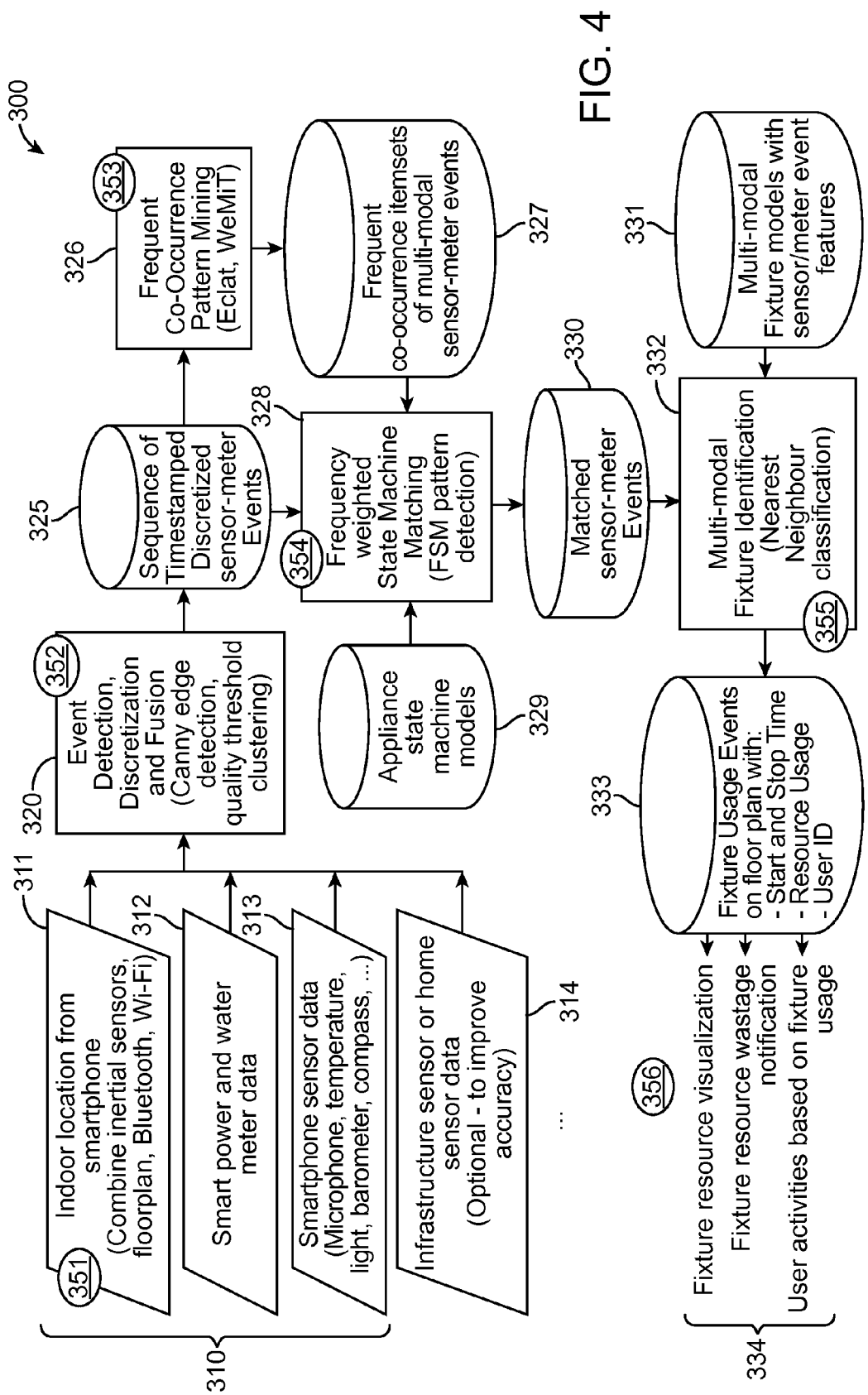
FIG. 4 shows an example flow diagram for a process, according to an embodiment.

FIG. 4 shows an example flow diagram 300 for a process for mobile fixture monitoring, according to an embodiment. In one embodiment, the flow diagram 300 includes inputs 310 that include determining indoor location 311, information from the smart power meter 132 and smart water meter 133, sensor data from the sensors 1-N 131 of electronic device(s) 120 and optionally infrastructure or home/location sensor data. In one embodiment, the input information 310 starts the process as step 351, which denotes the step of acquiring data from the input sources 310. In one embodiment, the data may be acquired and processed on the electronic device in an application 127; in another embodiment, the data may flow to an application in a local server or cloud 130 for processing and fusion. In one embodiment, the process flows to step 352 that includes collection of algorithms/processes for event detection, discretization and fusion 325.

In one embodiment, the output from step 352 is a sequence of time stamped discretized sensor-meter events 325, which then is forwarded to step 353 and 354. In one embodiment, step 353 includes frequent co-occurrence pattern mining. In one embodiment, the output of step 353 is collected/stored as frequent co-occurrence itemsets of multi-modal sensor-meter events 327. In one embodiment, the collections of 325 and 327, along with appliance state machine models 329 are input to step 354 that includes a frequency weighted state machine matching algorithmic process 328. In one embodiment, the outputs of step 354 are collected as matched sensor-meter events 330.

In one embodiment, the matched sensor-meter events 330 and multi-modal fixture models with sensor/meter event features 331 are input to step 355 that provides multi-modal fixture identification 332. In one embodiment, the output of step 355 is collected information 333 that includes fixture usage events on floor plan with: start and stop time, resource usage and user identification (ID). In one embodiment, the collected information 333 is used at step 356 to output resource and activity information 334 that includes resource usage visualization, fixture resource wastage notification and user activities based on fixture usage.

In one embodiment, the process for mobile fixture monitoring is suited to analyze mobile device sensor data (e.g., electronic device 120 sensor 1-N 131 data) and smart meter data (e.g., power meter 132 and water meter 133 data), but is also extensible enough to work with other types of home sensors or infrastructure sensors. The details of steps 351-356 are further described below.

In one embodiment, step 351 comprises data acquisition. In one example embodiment, in step 351 data is acquired as discussed above. In one embodiment, the acquired data may be processed on the electronic device 120 periodically to produce visualizations to the end user. In one example embodiment the acquired date may also be sent to a local computing server that receives the data, runs the mobile fixture monitoring process on the acquired data, and returns the results to the end user's electronic device 120.

Figure 5:
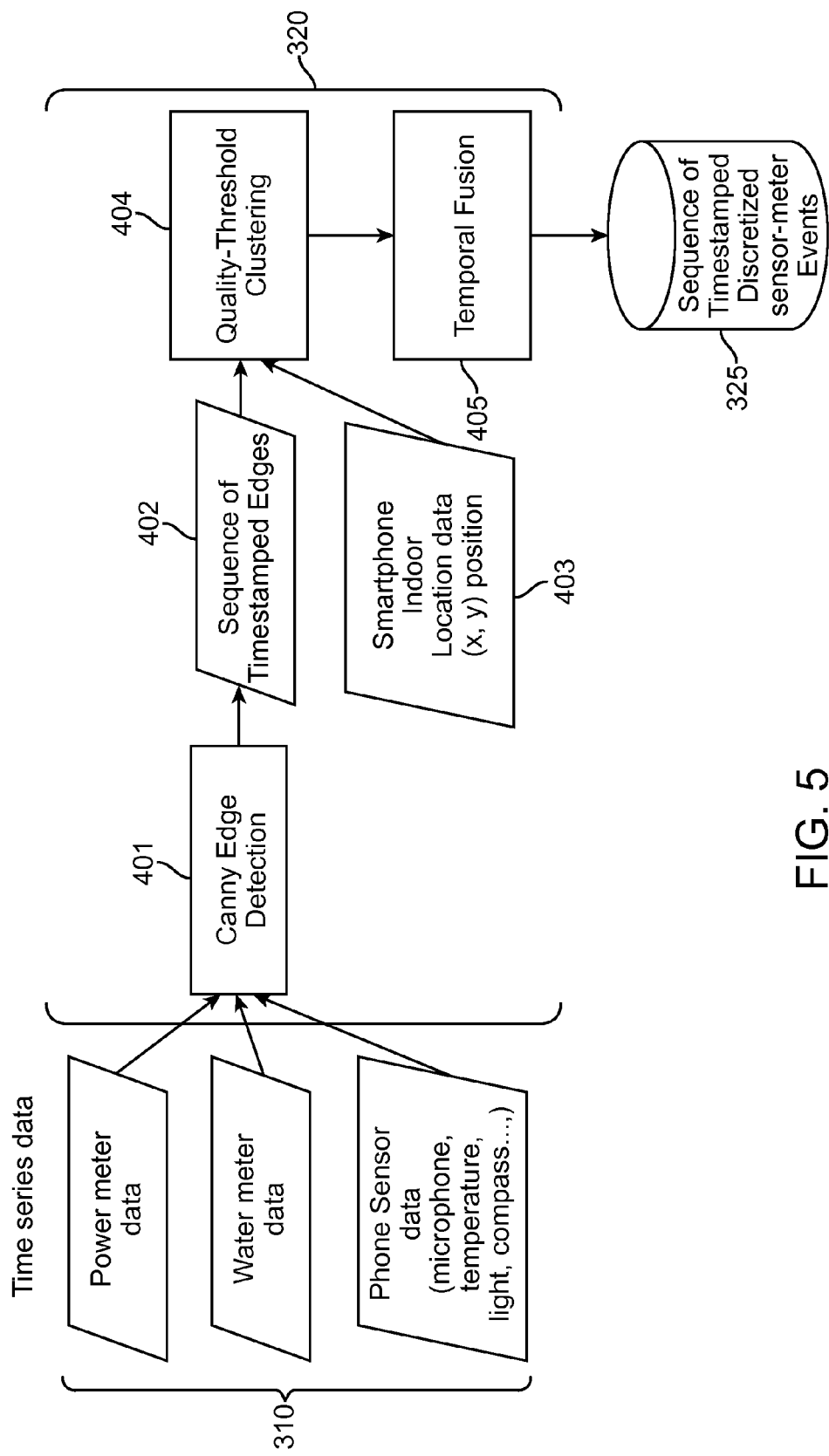
FIG. 5 shows a further detailed flow diagram for a portion of the process shown in FIG. 4, according to an embodiment.

FIG. 5 shows a further detailed flow diagram for a portion of the flow diagram 300 shown in FIG. 4, according to an embodiment. In one embodiment, step 352 includes event detection, discretization, and fusion. In one embodiment, in step 352, the process portion 320 includes canny edge detection 401, sequence of time stamped edges 402, electronic device 120 indoor location data position determination 403, quality threshold clustering 404 and temporal fusion 405.

In one embodiment, the canny edge detection determination 401 computes events from the water meter 133 and power meter 132 data stream, and electronic device 120 sensor 131 1-N streams. In one embodiment, the indoor location data from the electronic device 120 already includes discrete co-ordinates obtained on the home/location floor plan, so no event detection is performed on this data source.

In one embodiment, events are discretized from each data source. In one embodiment, to discretize all data events, the quality threshold clustering 404 processing is used with a different maximum distance depending on the characteristics of the event type. In one embodiment, in the step of temporal fusion 405, a window parameter is used, for example 5 seconds (depending on time synchronization precision) to extract a sequence of discrete sensor-meter event itemsets 325 that occurs together.

Figure 6:
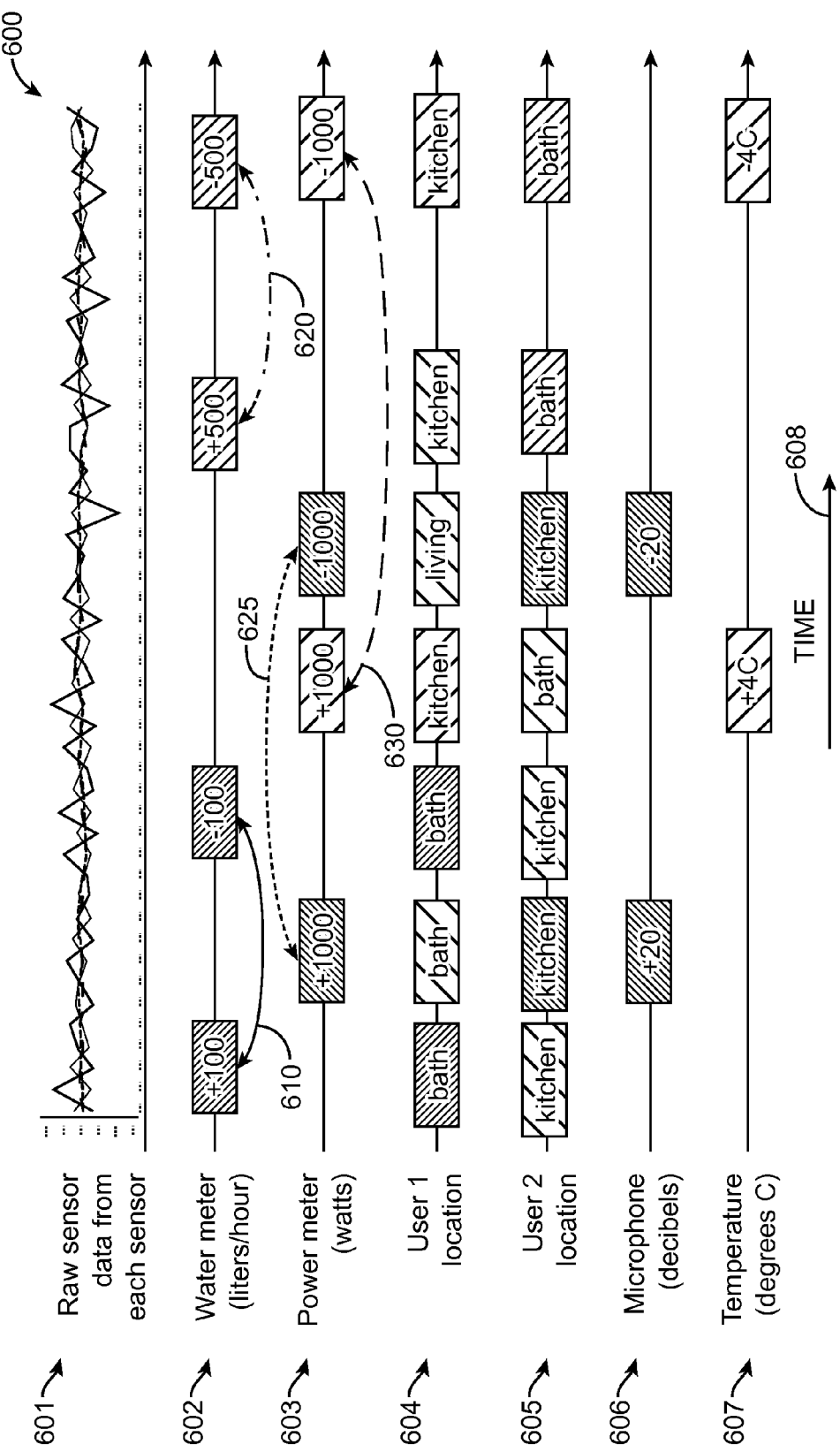
FIG. 6 shows an example diagram for frequent sensor-meter event itemsets in a graphical representation, according to an embodiment.

FIG. 6 shows an example diagram 600 that illustrates the example outputs and operation of steps 351, 352, 353, and 354. In one embodiment, the output of step 351 is raw sensor data time series from smart meters, device location, and device sensors as denoted by 601. In one embodiment, an intermediate output of step 352 is a sequence of time stamped discretized events from each sensor stream, as shown in the example diagram 600 versus time 608. In one example embodiment, the example diagram 600 shows discretized, timestamped events from 6 different data streams: water meter (liters/hour) events 602, power meter (watts) events 603, user 1 location events 604, user 2 location events 605, microphone (decibels) events 606 and temperature (degreed C.) events 607.

In one example, as shown in FIG. 6, step 352 detects two co-occurring sensor-meter event itemsets after the temporal fusion step 405: firstly, a sensor-meter event itemset of (+100 liters/hour from water meter 133, user1 bath location, user2 kitchen location) occurring around the same time, and secondly, a sensor-meter event itemset of (+1000 Watts from power meter 132, user1 bath location, user2 kitchen location, +20 decibels event from microphone 122 sensor) occurring around the same time.

In one embodiment, in step 353 frequent Co-Occurrence Pattern Mining, an efficient frequent itemset mining algorithm (e.g., Eclat) is used to discover the frequent sensor-meter event itemsets from the output of step 352. In one embodiment, the output of step 353 is a set of frequent co-occurrence itemsets of multi-modal sensor-meter events 327, along with the frequency of occurrence of each frequent co-occurrence itemset.

In one embodiment, the example diagram 600 shows the frequent sensor-meter event itemsets identified in the sample data trace presented using different indications to point out the frequent itemset. Based on frequent itemset mining performed on the log of sensor-meter event itemsets, in one example, the itemset (+100 liters/hour, user1 bath) may be identified as a frequent itemset, and in the second example, the itemset (+1000 Watts, user2 kitchen, +20 decibels) may be identified as another frequent itemset.

In one embodiment, step 354 shown in FIG. 4 includes frequency weighted state machine matching, which matches ON sensor-meter itemsets to OFF sensor-meter itemsets. In one embodiment, in step 354, pre-stored appliance state machine models are used to match ON sensor-meter events to OFF sensor-meter events. In one embodiment, the frequencies of the co-occurrence itemsets from step 353 are used for deciding which ON events to match with which OFF events accurately. In one example embodiment, selecting and matching ON and OFF sensor-meter event itemsets with higher frequencies is used, and lower weighting is assigned to mapping ON and OFF sensor-meter event itemsets with lower frequencies. In one embodiment, a Finite State Machine (FSM) pattern detection solution is used to map the pre-stored state machine models to the observed ON and OFF events. In one example embodiment, an existing genetic algorithm for pattern detection in non-intrusive load monitoring may be used. In one embodiment, the pre-stored appliance state machine models may be obtained from a sample set of training homes/locations based on the power and water flow state transitions of typical home/location appliances and fixtures.

In one embodiment, the example diagram 600 shows how the matching process in step 353 works on an example. In FIG. 6, we show four example ON-to-OFF matching sensor-meter event itemsets, indicated as 610, 620, 625 and 630. In example diagram 600, each ON sensor-meter event is matched to one OFF sensor-meter event since the fixtures involved in the example are two-state ON-OFF fixtures. In one embodiment, the matching is performed not simply based on the meter edge, but by also looking at the frequent itemsets occurring in each event itemset, and their weights. In one example embodiment, the +1000 watt event from kitchen is matched with reference 630 to the −1000 watt event from kitchen with the associated 4 Celsius event from the temperature sensor (based on a stove usage), and not to the −1000 watt event from the kitchen with the −20 decibel event (based on microwave oven usage), which is matched at reference 625. In one embodiment, the multi-modal signature of event itemsets containing both the meter and sensor events is important in accurately creating matched events and computing the usage times and resource usage of home fixtures in the mobile fixture monitor application 127.

Figure 7:
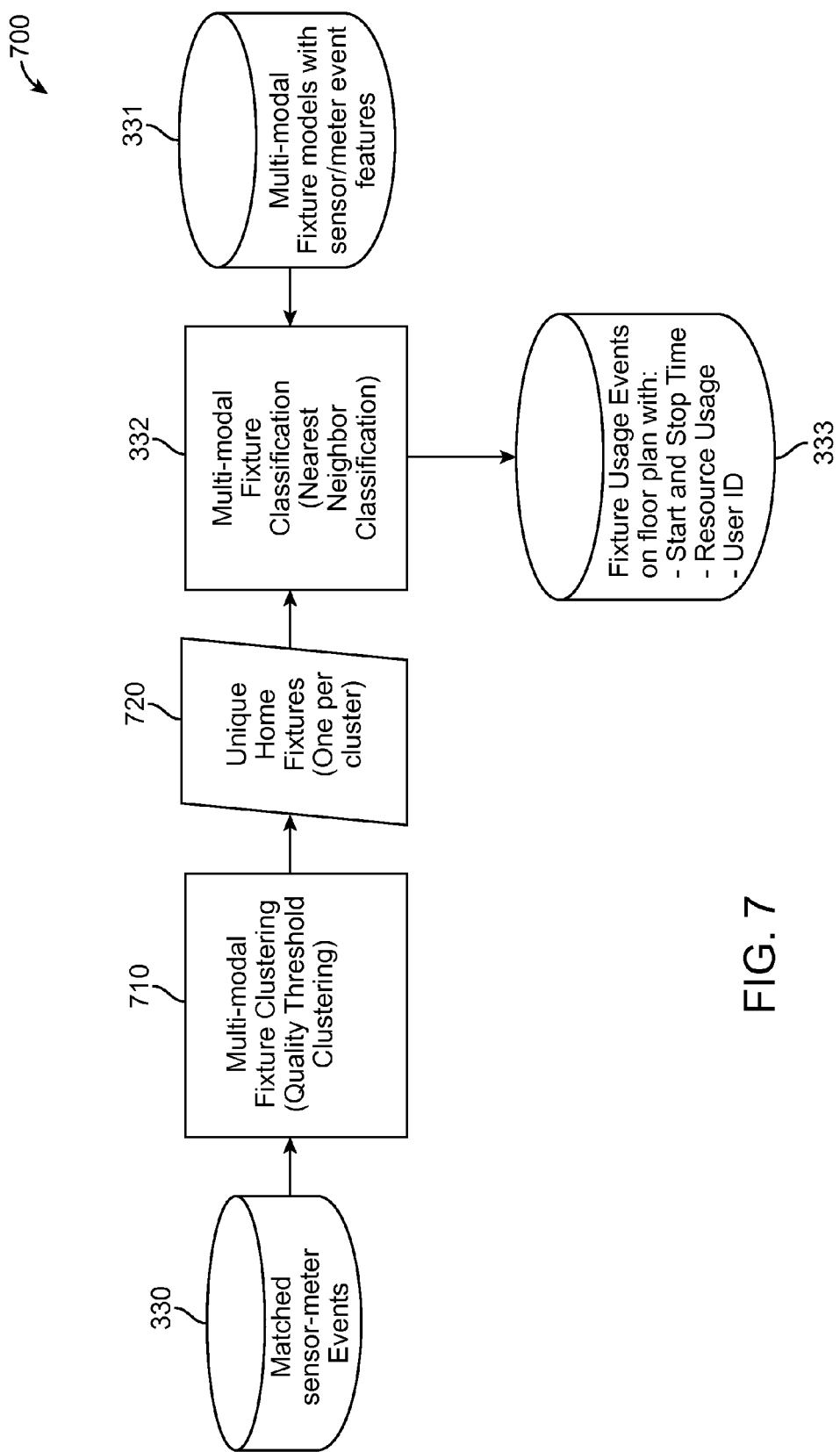
FIG. 7 shows a further detailed flow diagram for a portion of the process shown in FIG. 4, according to an embodiment.

FIG. 7 shows a further detailed flow diagram for a portion (step 355) of the process shown in FIG. 4, according to an embodiment. In one embodiment, in the flow diagram 700, step 355 includes multi-modal fixture identification. In one embodiment, each individual fixture is identified by first clustering the matched sensor-meter events 330 (in block 710) to a set of unique fixtures (in block 720) using quality-threshold clustering. In one embodiment, each cluster is then classified (in block 332) to a fixture category based on a pre-stored multi-modal fixture model data 331. In one embodiment, the multi-modal fixture model data 331 for each fixture may include characteristic features of its effect on electronic device 120 sensors 131 1-N, smart meters (e.g., power meter 132, water meter 133), or time duration, semantic room location, and time of day of usage of the appliance or fixture. In one example embodiment, a nearest neighbor classifier is used in block 332 to perform the classification. In one embodiment, the output 333 is a sequence of matched ON-OFF sensor-meter event itemsets, where each itemset has a resource usage, user identifier of the user who used the appliance, along with the unique identifier and category of the fixture such as sink, microwave, flush or stove.

In one example embodiment, based on the power usage value (+1000 W) and the microphone feature (+20 decibels), the matched ON-OFF event itemset 625 from FIG. 6 is labeled as a microwave appliance, by using a nearest neighbor classifier trained with those features.

Figure 8:
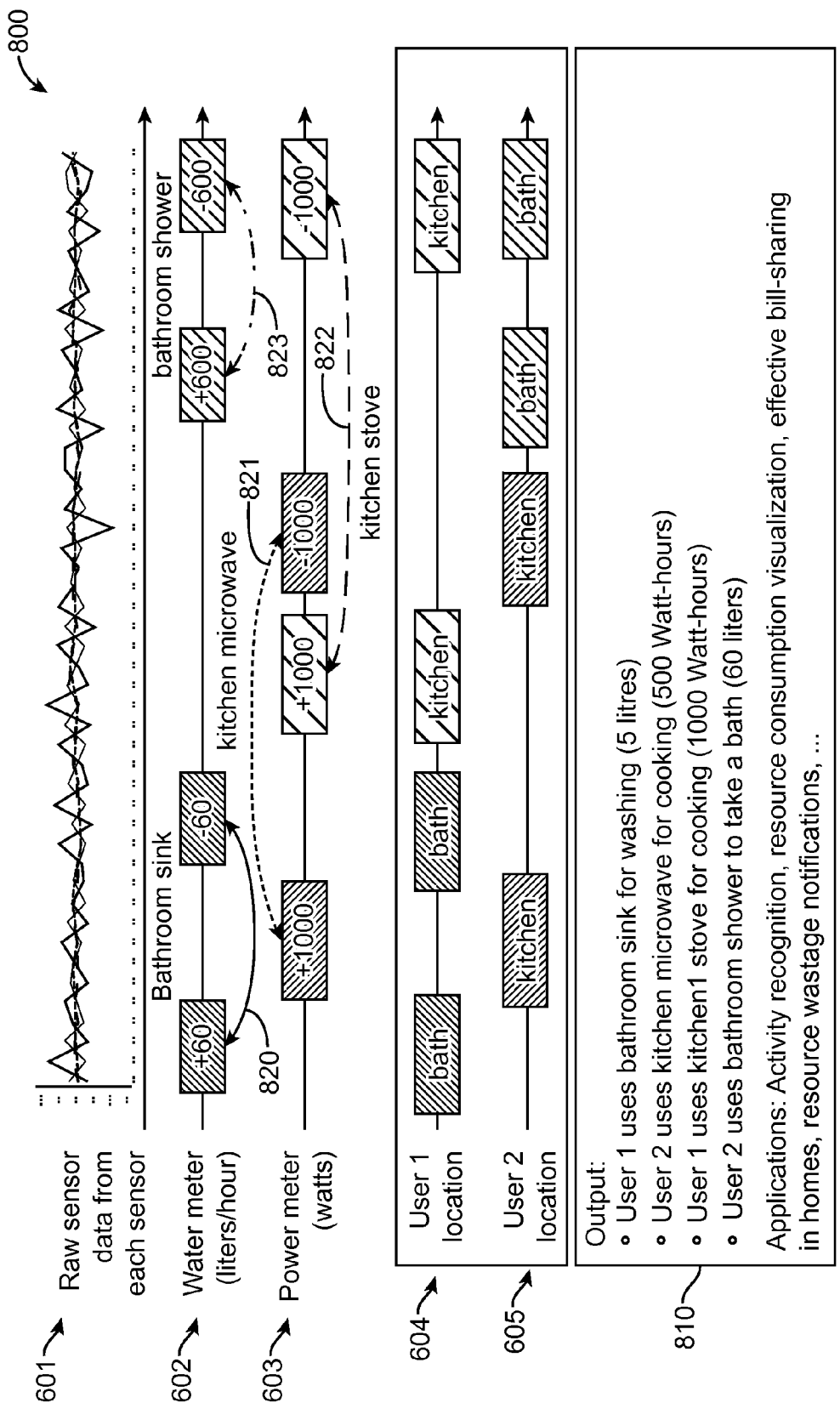
FIG. 8 shows an example diagram indicating an example application process in a graphical representation, according to an embodiment.

FIG. 8 shows an example diagram 800 indicating an example graphical representation of an application process, according to an embodiment. In one embodiment, step 356 includes end user applications. In one embodiment, in step 356, the fixtures, their categories, associated power and water meter event values, electronic device 120 locations and identifiers are used to compute all the outputs (e.g., inferences (a) through (g) listed above) for the mobile fixture monitor application 127. In one embodiment, to calculate the resource usage, the ON and OFF times are used, and the associated ON and OFF values of instantaneous power or water consumption are used to compute the total water or energy usage. In one embodiment, for example two-state ON-OFF appliances, resource usage=(OFF−ON time)*(rate of resource consumption).

In one example embodiment, the mobile fixture monitor application 127 shows outputs 810 where user1 uses the bathroom sink for washing, and consumes 5 liters in the process (matched ON/OFF 820), while user2 uses the kitchen microwave for cooking, consuming 500 Watt-hours (matched ON/OFF 821) of energy in the process. In one embodiment, in general, the results may be used in medical monitoring or activity recognition applications, resource consumption visualization for end users, effective bill-sharing among multiple residents in a home by understanding their individual resource usage, and notifying users when they are wasting resources (e.g., a user3 turns on bedroom light but forgets to turn off before leaving the bedroom for 4 hours).

In another example, the mobile fixture monitor application 127 shows outputs 810 where user1 uses the kitchen stove for cooking, and consumes 1000 Watt-hours in the process (matched ON/OFF 822), while user2 uses the bathroom shower to take a bath, consuming 60 liters (matched ON/OFF 823) of water in the process.

In one embodiment, in addition to smart meter data and electronic device 120 sensor 1-N 131 data, the applications may be extended to leverage infrastructure sensors. In one example embodiment, infrastructure sensors are sensors installed on the home's/location's electricity or water lines and monitor distinct noise signatures of individual fixtures. In one example embodiment, these noise signatures may be discretized and added to the sensor-meter event itemsets in step 352 to improve monitoring accuracy further.

In one embodiment, in step 351, alternative wearable devices, such as smart watches, pendants, etc., that have the same sensing capabilities as an electronic device 120 may be used. In one embodiment, in step 352, instead of canny edge detection in 320, alternative edge detection algorithms may be used, such as differential edge detection.

In one embodiment, in step 352, instead of using quality threshold clustering to perform discretization, other approaches may be used, such as rounding to nearest multiple of 10 or 100, or using other clustering approaches, such as db-scan. In one example embodiment, the fusion step (in step 352) combines sensor and meter events that occur within a short time duration (e.g., 5 seconds). In one example embodiment, alternatively, event itemsets may be computed over multiple timescales and the application 127 may use longer term temporal correlation to identify fixtures based on multi-modal sensor signatures.

In one embodiment, alternative frequent itemset mining algorithms may be used in step 353, such as the Apriori, FP-growth, or CHARM algorithms. In one example embodiment, alternative classification algorithms may be used to identify fixture categories in step 355, such as SVMs, decision trees, or neural networks. In one embodiment, the data may be processed and visualized on an electronic device 120 or be sent to a local server (e.g., server 130, FIG. 2) which executes the mobile fixture monitor application 127 and pushes results back to electronic devices 120. In one embodiment, additional features may be extracted for each sensor 1-N 131 (FIG. 2) or meter edge in addition to intensity, such as edge transient time.

In one embodiment, electronic device 120 sensor 1-N 131 data collection may be triggered intelligently based on a subset of sensor data or context to save power. In one example embodiment, sensors, such as a microphone 122, may be turned on only if we sense movement from the user along with events from the power meter 132 or water meter 133. In one embodiment, additional electronic device 120 sensors 1-N 131 may include color or camera sensors, and may be added to improve monitoring accuracy if available and acceptable to the end user.

Figure 9:
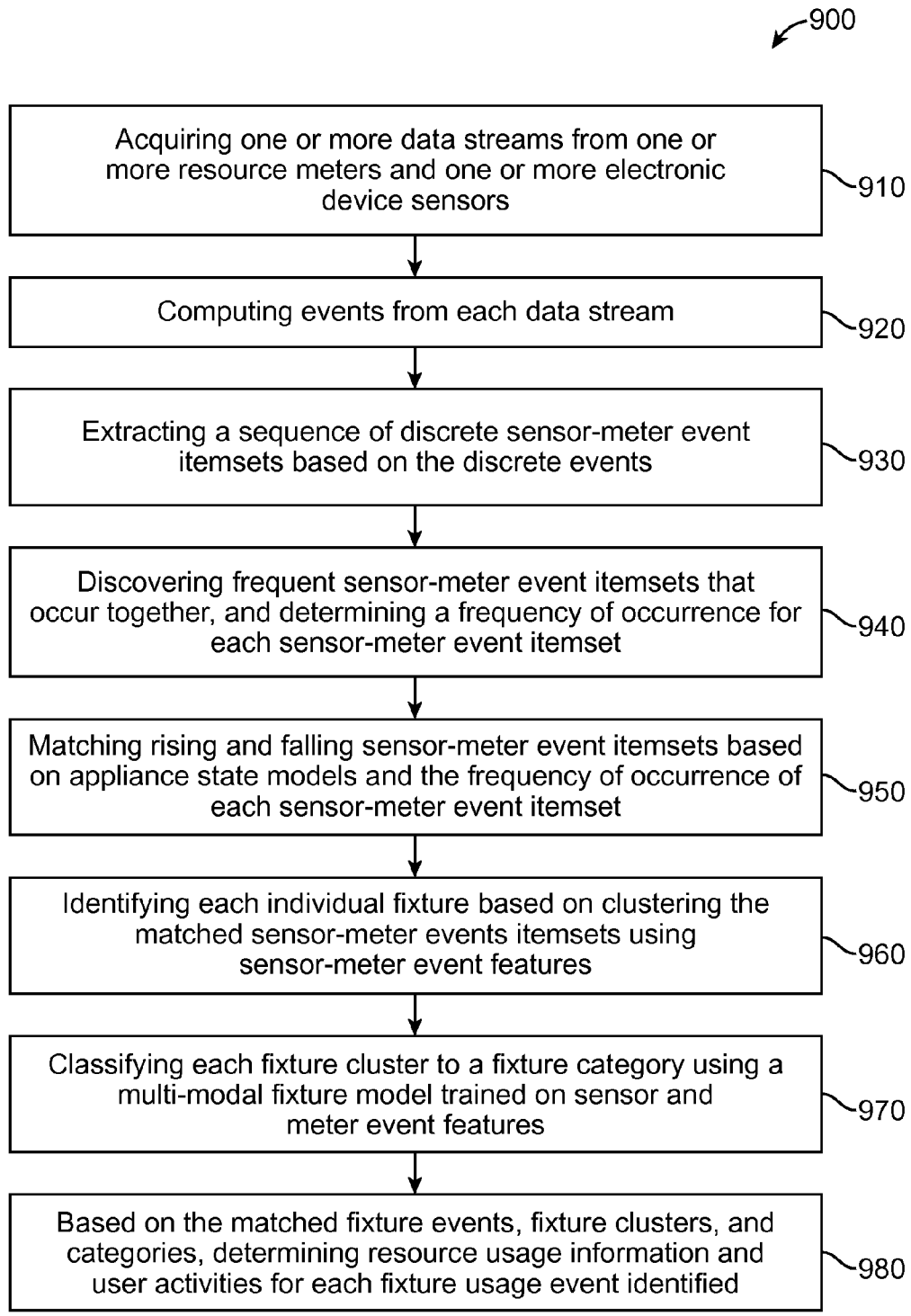
FIG. 9 shows a process for monitoring resource information and user activity, according to one embodiment.

FIG. 9 shows a process 900 for monitoring resource information and user activity, according to one embodiment. In one embodiment, in block 910 one or more data streams are acquired from one or more resource meters (e.g., power meter 132, water meter 133, FIG. 2) and one or more electronic device sensors (e.g., electronic device 120 sensors 1-N 131). In one embodiment, the electronic device sensors provide indoor location data. In one embodiment, in block 920 discrete events from each data stream are computed using, for example, Canny edge detection or other discretization algorithms.

In one embodiment, in block 930 a sequence of discrete sensor-meter event itemsets are extracted based on the sensor and meter events computed in block 920 that occur around the same time. In one embodiment, in block 940 frequent sensor-meter event itemsets that occur together are discovered, and a frequency of occurrence of each frequent sensor-meter event itemset is determined.

In one embodiment, in block 950 rising (ON events) and falling (OFF events) sensor-meter event itemsets are matched based on appliance state models (e.g., pre-stored, pre-collected, etc.) and the frequency of occurrence of each sensor-meter event itemset.

In one embodiment, in block 960 each individual fixture is identified based on clustering the matched sensor-meter event itemsets using sensor-meter event features.

In one embodiment, in block 970, each fixture cluster is classified to a fixture category using a multi-modal fixture model trained on sensor and meter event features. In one embodiment, in block 980, based on the matched fixture events, fixture clusters, and categories, resource usage information and user activities for each fixture usage event identified are determined.

In one embodiment, the resource information includes one or more of: location and presence of electrical appliances and water fixtures; location of fixtures on a floor plan (e.g., home, location, etc.); use time of one or more of each individual fixture and electrical appliance; and one or more of energy and water resource consumption of one or more of each individual fixture and electrical appliance. In one embodiment, the one or more user activities may include: one or more particular users that used a particular appliance or fixture; one or more resources wasted by the one or more particular users; and related daily activities of the one or more particular users in view of appliance or fixture usage and activity area.

In one embodiment, in process 900 determining related daily activities of the one or more particular users may include using a pre-stored activity classifier trained on fixture usage data from a set of training locations. In one embodiment, determining the location of fixtures on the floor plan may include using a median location for all location events from a given fixture cluster.

In one embodiment, the sensor-meter event features comprise one or more of sensor event magnitude and meter event magnitude. In one embodiment, process 900 may include that based on the matched fixture events, fixture clusters, and categories, user identifiers and locations for each fixture usage event identified is determined. In one embodiment, the discrete events occur together within a same particular time frame (i.e., at or near the same time, within a predetermined minute window (e.g., 0.5 sec., 1 sec., etc.).

Figure 10:
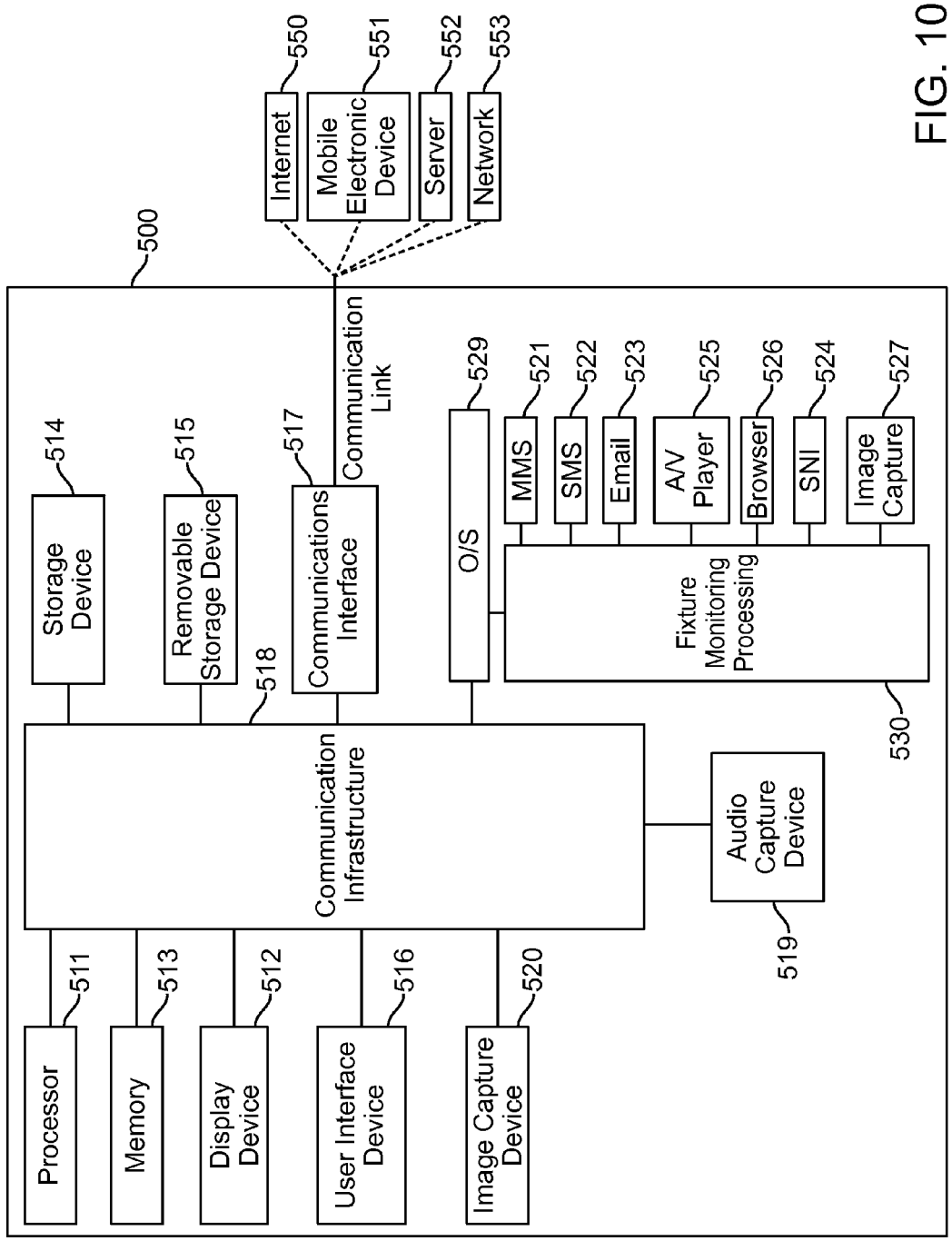
FIG. 10 is a high-level block diagram showing an information processing system comprising a computing system implementing one or more embodiments.

FIG. 10 is a high-level block diagram showing an information processing system comprising a computing system 500 implementing one or more embodiments. The system 500 includes one or more processors 511 (e.g., ASIC, CPU, etc.), and may further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, smartphone, tablet, mobile computing device, wearable device, etc.), the system 500 further includes an image capture device 520, such as a camera 128 (FIG. 2), and an audio capture device 519, such as a microphone 122 (FIG. 2). The system 500 may further include application modules as MMS module 521, SMS module 522, email module 523, social network interface (SNI) module 524, audio/video (AV) player 525, web browser 526, image capture module 527, etc.

In one embodiment, the system 500 includes a fixture monitoring processing module 530 that may implement processing similar as described regarding monitoring resource usage and user activity related to resource usage, appliance usage, etc. (FIG. 4), and components in block diagram 200. In one embodiment, the fixture monitoring processing module 530 may implement the process of flowchart 900 (FIG. 9) and flow diagram 300 (FIG. 4). In one embodiment, the fixture monitoring processing module 530 along with an operating system 529 may be implemented as executable code residing in a memory of the system 500. In another embodiment, the fixture monitoring processing module 530 may be provided in hardware, firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for monitoring resource information and user activity comprising:
    acquiring one or more data streams from one or more resource meters and one or more electronic device sensors;
    computing discrete events from each data stream;
    extracting a sequence of discrete sensor-meter event itemsets based on the discrete events;
    discovering frequent sensor-meter event itemsets that occur together, and determining a frequency of occurrence for each sensor-meter event itemset;
    matching rising and falling sensor-meter event itemsets based on appliance state models and the frequency of occurrence of each sensor-meter event itemset;
    identifying each individual fixture based on clustering the matched sensor-meter event itemsets using sensor-meter event features;
    classifying each fixture cluster to a fixture category using a multi-modal fixture model trained on sensor and meter event features; and
    based on the matched fixture events, fixture clusters, and categories, determining resource usage information and user activities for each fixture usage event identified.

2. The method of claim 1, wherein:
    the one or more electronic sensors provide location data;
    the discrete sensor-meter event itemsets contain events that occur together within a same particular time frame; and
    the resource information comprises at least one of:
        location presence of electrical appliances and water fixtures;
        location of fixtures on a floor plan;
        use time of one or more of each individual fixture and electrical appliance; and
        one or more of energy and water resource consumption of one or more of each individual fixture and electrical appliance.

3. The method of claim 2, wherein the one or more user activities comprise:
    one or more particular users that used a particular appliance or fixture;

one or more resources wasted by the one or more particular users; and related daily activities of the one or more particular users in view of appliance or fixture usage and activity area, wherein based on the matched fixture events, fixture clusters, and categories, further determining user identifier and location for each fixture usage event identified.

4. The method of claim 3, further comprising:
computing discretized events from each data stream, computing sensor-meter event itemsets based on the sensor and meter events that occur together near a same time, and computing the frequent sensor-meter event itemsets along with the frequency of occurrence of each sensor-meter event itemset.

5. The method of claim 4, wherein matching the rising and the falling sensor-meter event itemsets further comprises using pre-stored appliance state machine models and frequencies of sensor-meter event itemsets for matching the rising sensor-meter event itemsets and the falling sensor-meter event itemsets to at least one appliance device usage instance.

6. The method of claim 5, wherein identifying each individual fixture comprises clustering the matched sensor-meter events to a set of unique clusters, and each cluster corresponds to a unique fixture at a location, and the sensor-meter event features comprise one or more of sensor event magnitude and meter event magnitude.

7. The method of claim 6, wherein classifying each fixture cluster identified to a fixture category comprises using a pre-stored multi-modal fixture classifier model that is trained on sensor-meter event features.

8. The method of claim 7, wherein:
determining related daily activities of the one or more particular users comprises using a pre-stored activity classifier trained on fixture usage data from a set of training locations; and
determining the location of fixtures on the floor plan comprises using a median location for all location events from a given fixture cluster.

9. The method of claim 1, wherein the one or more electronic device sensors comprise one or more of: an accelerometer, a gyroscope, a microphone, a temperature sensor, a light sensor, a barometer, a magnetometer, and a compass.

10. The method of claim 9, wherein the one or more resource meters comprise one or more of a smart water meter and a smart electrical meter, and the electronic device comprises a mobile electronic device.

11. The method of claim 10, wherein the mobile electronic device comprises at least one of: a mobile telephone, a wearable computing device, a tablet device, and a mobile computing device.

12. A system comprising:
an electronic device that includes a plurality of sensor devices, wherein the electronic device is configured to:
acquire one or more data streams from one or more resource meters and one or more electronic sensors;
compute discrete events from each data stream;
extract a sequence of discrete sensor-meter event itemsets based on the events that occur together;
discover the frequent sensor-meter event itemsets that occur together, and compute a frequency of occurrence for each sensor-meter event itemset;
match rising and falling sensor-meter event itemsets based on appliance state models and the frequency of occurrence of each sensor-meter event itemset;

identify each individual fixture based on clustering the matched sensor-meter event itemsets using sensor-meter event features;
classify each fixture cluster to a fixture category using a multi-modal fixture model trained on sensor and meter event features; and
based on the matched fixture events, fixture clusters, and categories, determine resource usage information and associated user activities for each fixture usage event identified.

13. The system of claim 12, wherein:
the one or more electronic sensors provide location data;
the discrete sensor-meter event itemsets contain events that occur together within a same particular time frame; and
the resource information comprises at least one of:
location presence information of electrical appliances and water fixtures at the location;
location of fixtures on a floor plan of the location;
use time of one or more of each individual fixture and electrical appliance at the location; and
one or more of energy and water resource consumption of one or more of each individual fixture and electrical appliance at the location.

14. The system of claim 13, wherein the one or more user activities comprise:
one or more particular users that used a particular appliance or fixture at the location;
one or more resources wasted by the one or more particular users; and
related daily activities of the one or more particular users in view of appliance or fixture usage and activity area at the location;
wherein based on the matched fixture events, fixture clusters, and categories, the electronic device determines user identifier and location for each fixture usage event identified.

15. The system of claim 14, wherein the electronic device is further configured to:
compute discretized events from each data stream, extract the sequence of discrete sensor-meter event itemsets based on the events that occur together within the same particular time frame, discover the frequent sensor-meter event itemsets that occur together, determine a frequency of occurrence for each sensor-meter event itemset, and match the rising and falling sensor-meter event itemsets based on pre-stored appliance state models and the frequency of occurrence of each sensor-meter event itemset, wherein each matched event corresponds to an instance of user usage of an appliance device.

16. The system of claim 15, wherein the electronic device is further configured to identify each individual fixture based on clustering the matched sensor-meter event itemsets using sensor-meter event features comprising one or more of sensor event magnitude and meter event magnitude.

17. The system of claim 16, wherein the electronic device is further configured to classify each fixture cluster to a fixture category using a pre-built multi-modal fixture model trained on sensor and meter event features.

18. The system of claim 17, wherein the electronic device is further configured to use the matched fixture events, fixture clusters and categories to:
determine related daily activities of the one or more particular users based on using a pre-stored activity classifier trained on fixture usage data from a set of training locations; and determine the location of fixtures on the floor plan based on using a median location for all location events from a given fixture cluster.

19. The system of claim 12, wherein the plurality of electronic device sensors comprises at least one of: an accelerometer, a gyroscope, a microphone, a temperature sensor, a light sensor, a barometer, a magnetometer, and a compass, and the one or more resource meters comprise one or more of a smart water meter and a smart electrical meter, and the electronic device comprises a mobile electronic device.

20. The system of claim 19, wherein the mobile electronic device comprises at least one of: a mobile telephone, a wearable computing device, a tablet device, and a mobile computing device.

21. A non-transitory processor-readable medium that includes a program that when executed by a processor performs a method comprising:
  acquiring one or more data streams from one or more resource meters and one or more electronic sensors;
  computing discrete events from each data stream;
  extracting a sequence of discrete sensor-meter event itemsets based on the events that occur together;
  discovering the frequent sensor-meter event itemsets that occur together, and determining a frequency of occurrence for each sensor-meter event itemset;
  matching rising and falling sensor-meter event itemsets based on appliance state models and the frequency of occurrence of each sensor-meter event itemset;
  identifying each individual fixture based on clustering the matched sensor-meter event itemsets using sensor-meter event features;
  classifying each fixture cluster to a fixture category using a multi-modal fixture model trained on sensor and meter event features; and
  based on the matched fixture events, fixture clusters, and categories, determining resource usage information and associated user activities for each fixture usage event identified.

22. The non-transitory processor-readable medium of claim 21, wherein:
  the one or more electronic sensors provide location data;
  the discrete sensor-meter event itemsets contain events that occur together within a same particular time frame; and
  the resource information comprises at least one of:
    location presence of electrical appliances and water fixtures;
    location of fixtures on a floor plan;
    use time of one or more of each individual fixture and electrical appliance; and
    one or more of energy and water resource consumption of one or more of each individual fixture and electrical appliance; and
  the one or more user activities comprise:
    one or more particular users that used a particular appliance or fixture;
    one or more resources wasted by the one or more particular users; and
    related daily activities of the one or more particular users in view of appliance or fixture usage and activity area.

23. The non-transitory processor-readable medium of claim 22, wherein the program when executed by the processor performs the method further comprising:
  computing discretized events from each data stream, and extracting a sequence of discrete sensor-meter event itemsets based on the events that occur together around the same time, wherein based on the matched fixture events, fixture clusters, and categories, further determining user identifier and location for each fixture usage event identified.

24. The non-transitory processor-readable medium of claim 23, wherein the program when executed by the processor performs the method further comprising:
  discovering the frequent sensor-meter event itemsets that occur together, and determining a frequency of occurrence for each frequent sensor-meter event itemset.

25. The non-transitory processor-readable medium of claim 24, wherein the program when executed by the processor performs the method further comprising:
  matching rising and falling sensor-meter event itemsets based on pre-stored appliance state models and the frequency of occurrence of each sensor-meter event itemset, wherein each matched sensor-meter event corresponds to a specific instance of user usage of an appliance device.

26. The non-transitory processor-readable medium of claim 25, wherein identifying each individual fixture comprises clustering the matched sensor-meter event itemsets to a set of unique fixture clusters using sensor-meter event features comprising one or more of sensor event magnitude and meter event magnitude, classifying each fixture cluster to a fixture category comprises using a pre-built multi-modal fixture classifier model trained on sensor and meter event features.

27. The non-transitory processor-readable medium of claim 26, further comprising using the matched fixture events, fixture clusters, and categories to:
  determine related daily activities of the one or more particular users using a pre-stored activity classifier trained on fixture usage data from a set of training locations; and
  determine location of fixtures on a floor plan using a median location for multiple location events from a given fixture cluster.

28. The non-transitory processor-readable medium of claim 21, wherein the one or more electronic device sensors comprise one or more of: an accelerometer, a gyroscope, a microphone, a temperature sensor, a light sensor, a barometer, a magnetometer, and a compass.

29. The non-transitory processor-readable medium of claim 28, wherein the one or more resource meters comprise one or more of a smart water meter and a smart electrical meter, and the electronic device comprises a mobile electronic device.

30. The non-transitory processor-readable medium of claim 29, wherein the mobile electronic device comprises at least one of: a mobile telephone, a wearable computing device, a tablet device, and a mobile computing device.

* * * * *